(12) United States Patent
Neranjan

(10) Patent No.: US 7,040,543 B2
(45) Date of Patent: May 9, 2006

(54) AIR TEMPERATURE CONTROL ASSEMBLY FOR INFRARED REMOTE

(75) Inventor: David D. Neranjan, Miramar, FL (US)

(73) Assignee: A-1 Components Corporation, Hialeah, FL (US)

( * ) Notice: Subject to any disclaimer, the term of this patent is extended or adjusted under 35 U.S.C. 154(b) by 0 days.

(21) Appl. No.: 10/623,938

(22) Filed: Jul. 18, 2003

(65) Prior Publication Data

US 2005/0011963 A1     Jan. 20, 2005

(51) Int. Cl.
G05D 23/00     (2006.01)
H04B 10/06     (2006.01)

(52) U.S. Cl. ............................ 236/47; 236/51; 398/212

(58) Field of Classification Search .................. 236/47, 236/51; 337/8, 9; 398/202, 212
See application file for complete search history.

(56) References Cited

U.S. PATENT DOCUMENTS

| 3,818,410 | A | * | 6/1974 | Hire ............................ 337/354 |
| 5,552,956 | A | | 9/1996 | Pasquarette et al. ........ 361/680 |
| 5,772,326 | A | * | 6/1998 | Batko et al. ................. 374/142 |
| 5,819,840 | A | * | 10/1998 | Wilson et al. ............. 165/11.1 |
| 6,082,894 | A | * | 7/2000 | Batko et al. ................. 374/142 |
| 6,550,686 | B1 | * | 4/2003 | Kawai et al. .............. 236/49.3 |

FOREIGN PATENT DOCUMENTS

JP     358140543 A     8/1983     ................. 236/51

* cited by examiner

Primary Examiner—Marc Norman
(74) Attorney, Agent, or Firm—Carlson, Gaskey & Olds

(57) ABSTRACT

An air temperature control assembly has an air temperature control unit with an optical receiver. A cover houses the air temperature control unit and the optical receiver. A light guide reflects light signals to the optical receiver. The light guide may be a reflecting surface angled to direct the light signal to the optical receiver.

23 Claims, 2 Drawing Sheets

AIR TEMPERATURE CONTROL ASSEMBLY FOR INFRARED REMOTE

BACKGROUND OF THE INVENTION

This invention relates to an air temperature control assembly for a heating and cooling unit, such as for a recreational vehicle.

An air temperature control is used to monitor and adjust a temperature setting for an air conditioner and heating unit. Because the unit is generally placed in a hard to access location, the control is located away from the unit to provide the opportunity to adjust ambient room temperature from a more convenient location. However, locating the air temperature control away from the air conditioner and heating unit requires the installation of wiring between the control and the unit. For a recreational vehicle, the installation of wiring can be expensive and time consuming. It is therefore preferable to place the air temperature control near the air conditioning and heating unit. For a recreational vehicle, this location presents particular design challenges.

Specifically, an air conditioning and heating unit is generally located on top of the recreational vehicle. This location is inconvenient for a vehicle occupant to adjust air temperature. Some manufacturers have overcome this problem by pairing the air temperature control with a wireless remote control, such as an infrared remote control. The remote control has an infrared transmitter, which the vehicle occupant uses to signal the air temperature control, which has an optical receiver to receive the signal. The control then adjusts the air conditioning and heating unit based on the received signal. However, these manufacturers have failed to develop an air temperature control assembly that facilitates the use of such a remote control with the air temperature control. For example, existing air temperature controls have an optical receiver mounted on the control cover to receive signals from the infrared remote control. This existing design has a limited range of operation. Consequently, existing controls may fail to receive a signal from the remote and respond accordingly. In this event, the vehicle occupant may not know that the air temperature control unit has failed to receive this signal until the vehicle occupant notices that the air temperature in the recreational vehicle has not changed.

In addition, there are times when the remote control may fail, such as when the batteries of the remote control run out. It is therefore important to allow adjustment of the air conditioning and heating unit without the remote control. While controls exist that allow the manual adjustment of air temperature, given the hard to reach location of the air temperature control near the air conditioning and heating unit, it is desirable to allow the vehicle occupant to adjust air temperature quickly and conveniently. It is also desirable to offer this convenient access to the air temperature control without significant additional expense in the manufacture of the air temperature control.

A need therefore exists for an inexpensive air temperature control unit that allows remote control of the air conditioner and heater without the drawbacks associated with existing designs.

SUMMARY OF THE INVENTION

The present invention comprises an air temperature control assembly with an optical receiver. The control and the optical receiver are housed within a cover. In contrast to existing air temperature controls, the inventive design uses a light guide to reflect light from a remote control, such as an infrared remote control, to the optical receiver to thereby broaden the range of operation of the remote control. The light guide has a reflecting surface angled to direct light to the optical receiver. The reflecting surface, in one example, comprises a channel having a first aperture and a second aperture. The first aperture is larger than the second aperture. The second aperture is located between the first aperture and the optical receiver. To reduce manufacturing cost, the channel may be incorporated as part of the cover.

In addition, in the event the remote control malfunctions, a manual switch is located on the control assembly to permit manual adjustment. To reduce manufacturing expense, the switch may comprise an arm which is part of the cover. The arm may be flexed between an actuated position and an unactuated position to operate the air temperature control unit. The arm may be recessed from the front surface of the cover to allow a control overlay to be placed on the cover without interfering with operation of the switch. The switch may further have a post extending from the arm to facilitate switching. The air temperature control assembly may have preset temperature set points that may be actuated by these manual switches. In this way, an individual can quickly and conveniently switch the air temperature to these presets without the remote control.

Like an existing air temperature control assembly, the inventive assembly has an air temperature sensor. However, given the location of the air temperature control unit, it is desirable to increase air flow circulation to this air temperature sensor. Accordingly, the inventive air temperature sensor has two vents: one vent located on one side of the cover and another vent located on the other. The air temperature sensor is located between these two vents. These vents allow the air temperature sensor to gauge more accurately room temperature.

In addition, one embodiment of the inventive air temperature control assembly has a speaker. This speaker is coupled to the optical receiver and responds with an audible sound when the optical receiver receives a light signal from the remote control. This speaker thus provides the vehicle occupant with noise feedback that the remote control has transmitted the signal and the air temperature control assembly has received it. The speaker may be provided with a speaker vent.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
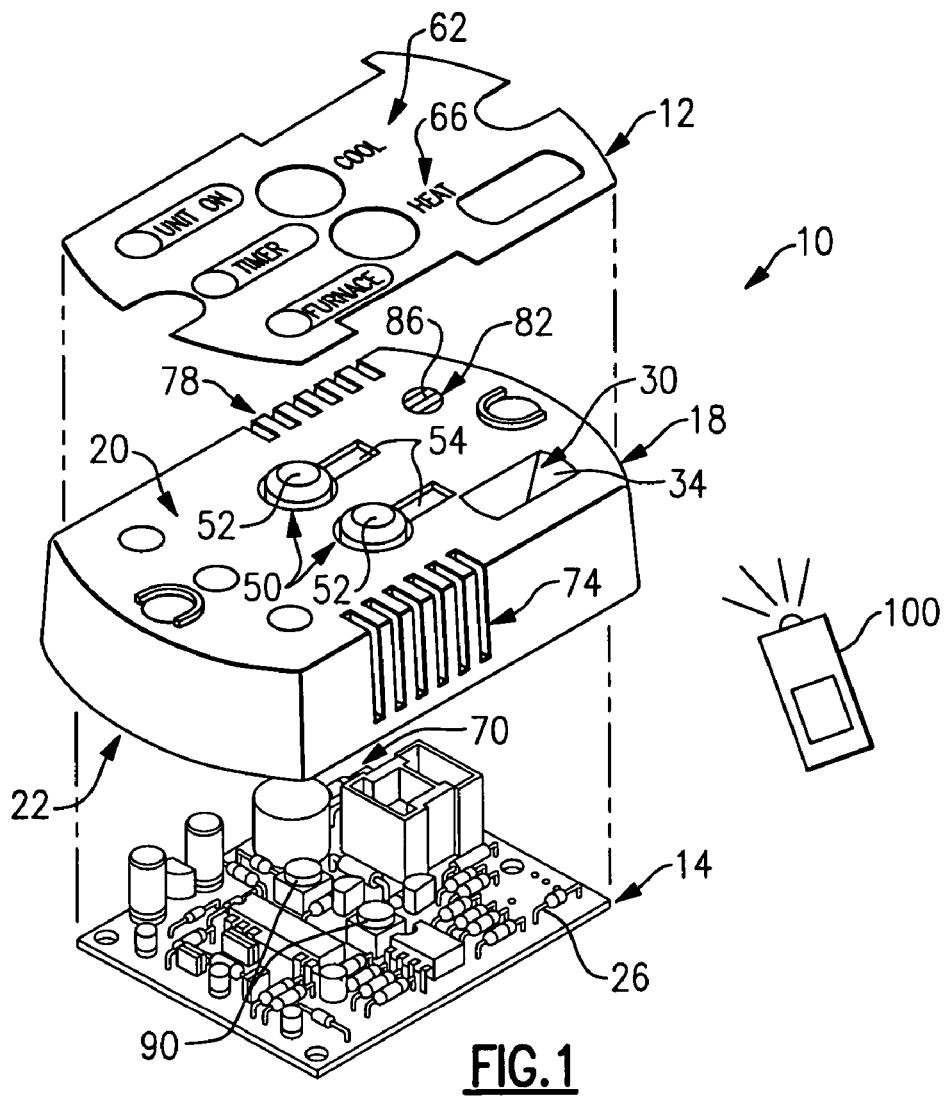
FIG. 1 illustrates an exploded view of the inventive air temperature control assembly.

FIG. 1 illustrates the inventive air temperature control assembly 10 in an exploded view. Like existing designs, air temperature control assembly 10 has air temperature control unit 14, which monitors and controls the temperature settings for an air conditioning and heating unit, such as may be found on a recreational vehicle. Air temperature control unit 14 has optical receiver 26 to receive a light signal from a remote control 100. The remote control may be an infrared transmitter. While optical receiver 26 may be an infrared optical receiver. As shown, cover 18 provides a protective housing for air temperature control unit 14 and optical receiver 26. Cover 18 may be made from molded plastic. Existing cover designs simply provide a window on the cover to permit a light signal to be transmitted to the optical receiver. Here, however, inventive air temperature control assembly 10 has light guide 30 that gathers and reflects light to optical receiver 26 and thereby increases the range of operation of an optical wireless remote control.

Figure 2:
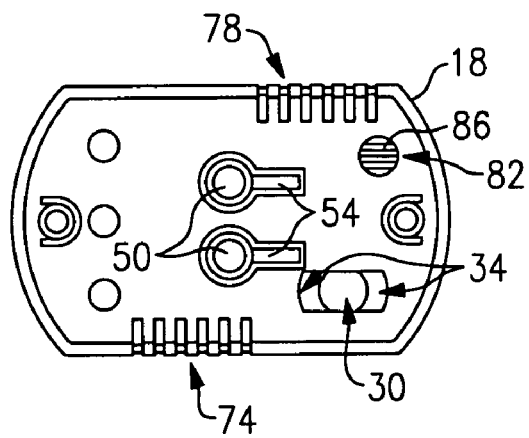
FIG. 2 illustrates a front view of the cover of the assembly of FIG. 1.
Figure 3:
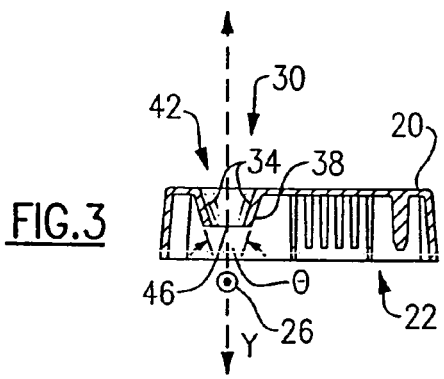
FIG. 3 illustrates a side cross-sectional view of the cover of FIG. 2, highlighting the light guide of the assembly.

FIG. 2 illustrates a front view of cover 18 and shows the location of light guide 30. FIG. 3 illustrates a cross-sectional view of the cover of FIG. 2 and highlights the unique shape of the example light guide 30. As shown in FIG. 3, light guide 30 comprises channel 38 having reflecting surfaces 34. On each side of reflecting surfaces 34 are provided apertures 42, 46. First aperture 42 is greater in size than second aperture 46. This difference in size serves to focus light on optical receiver 26.

Reflecting surfaces 34 are angled relative to axis Y so as to direct light toward optical receiver 26. Preferably, reflective surfaces 34 are angled at 20° relative to axis Y thereby creating a 40° angle θ for light guide 30 to receive light along axis Y. Light guide 30 will accordingly receive a light signal through aperture 42 and reflect the light signal from reflective surfaces 34 past second aperture 46 to optical receiver 26.

As shown in FIG. 1, in the event that the remote control malfunctions, inventive air temperature control assembly 10 is provided with switches 50, which allow the actuation of air temperature set points 62 and 66. FIG. 1 illustrates that first air temperature set point 62 is a cool air temperature set point while second air temperature set point 66 is a warm temperature set point. These air temperature set points 62, 66 may be preset by the manufacturer at specific temperatures. For example, first air temperature set point may be set at 68° Fahrenheit while second air temperature set point 66 may be set at 72° Fahrenheit. First air temperature set point 62 is cooler than second air temperature set point 66. By actuating switches 50, first air temperature set point 62 and second air temperature set point 66 may be actuated. If first air temperature set point 62 is selected through switch 50, then air temperature control assembly 10 activates an air conditioner to lower temperature to a specific set point. If second air temperature set point 66 is actuated through switch 50 then air temperature control assembly 10 actuates a heater to warm the room to a particular temperature set point.

Figure 4:
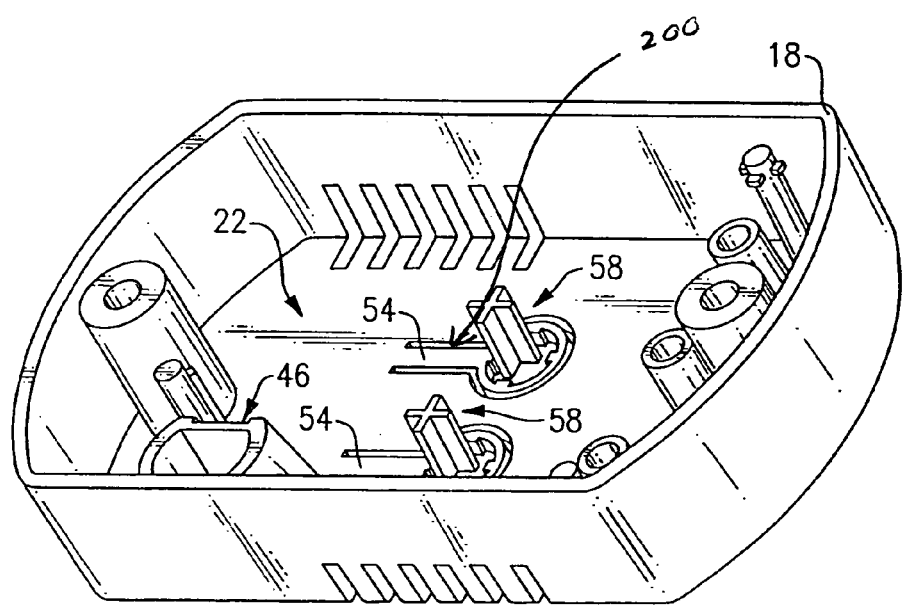
FIG. 4 illustrates a back view of the cover of the assembly, highlighting the inventive switches.
Figure 5:
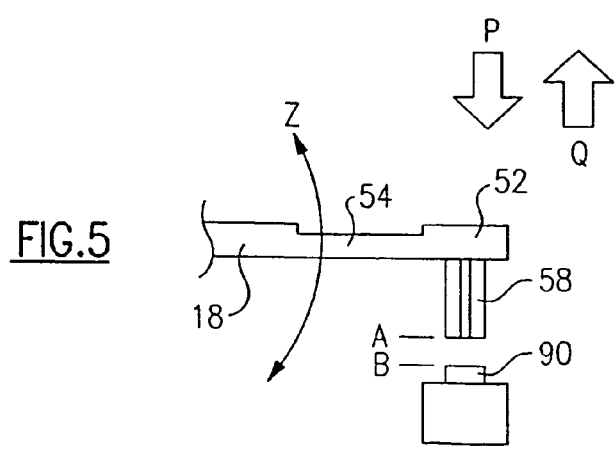
FIG. 5 illustrates arm of cover of FIG. 4.

Switch 50 comprises button 52 and arm 54 as shown in FIGS. 1 and 4. Arm 54 is recessed from front surface 20 of cover 18 so that overlay 12 may be adhered to cover 18 and not interfere with movement of arm 54. As shown in FIG. 4, buttons 52 are integrally formed with posts 58, which extend perpendicularly to arms 54 from backside 22 of cover 18. Opening 200 extends along arm 54 and button 52 as shown. As shown in FIG. 5, arm 54 is flexible relative to cover 18 along curve Z. In resting position post 58 is at unactuated position A, a position where post 58 is not in contact with switch 90. However, when button 52 is pressed in the direction of arrow P arm 54 flexes along curve Z to position B, a position where the post 58 is in contact with touch switch 90, to thereby actuate touch switch 90. Arm 54 returns to its original position in the direction of arrow Q when button 52 is no longer depressed.

As shown in FIG. 1 and FIG. 2, switches 50 are integrally formed with cover 18. This greatly reduces the expense of switches 50 and facilitates the construction of air temperature control assembly 10 as switches 50 may be formed on cover 18 so as to fit over touch switches 90 of air temperature control unit 14. No separate connection between switches 50 and touch switch 90 is required.

In addition, air temperature control 10 is provided with air temperature sensor 70, which provides an ambient air temperature reading for air temperature control unit 14. Given the anticipated location of air temperature control assembly (i.e., near an air conditioning and heating unit of a recreational vehicle), it is desirable to improve air flow to air temperature sensor 70. Accordingly, air temperature control assembly 10 has two air vents: first air vent 74 and second air vent 78. Air temperature sensor 70 is spaced between first air vent 74 and second air vent 78. As shown in FIGS. 1 and 2, first air vent 74 is located across cover 18 from second air vent 78. In this way, air flow may be exchanged between first air vent 74 and second air vent 78 to improve air flow over air temperature sensor 70.

In addition, air temperature control assembly 10 has speaker 82 with speaker vent 86. Speaker 82 is linked to optical receiver 26 so that when optical receiver 26 receives a light signal from a remote control, speaker 82 emits an audible sound. Air temperature control assembly 10 thereby acknowledges receipt of the light signal from the remote control and apprises the user that his signal has been received.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air temperature control assembly comprising:
   an air temperature control unit;
   a cover for said air temperature control unit;
   an optical receiver for receiving a light signal, said optical receiver for communication with said air temperature control unit and housed within said cover; and
   a light guide for communication with said optical receiver for reflecting the light signal to said optical receiver, said light guide on said air temperature control unit.

2. The air temperature control assembly of claim 1 wherein said light guide comprises a reflecting surface angled to direct the light signal to said optical receiver.

3. The air temperature control assembly of claim 1 including a switch for communicating with said air temperature control unit, said switch comprising an arm formed from said cover wherein said arm is flexible between an actuated position and an unactuated position.

4. The air temperature control assembly of claim 3 wherein said cover comprises a front surface and a back surface, said arm recessed from said front surface.

5. The air temperature control assembly of claim 4 including a post extending transversely from said arm wherein said post is movable between said actuated position and said unactuated position.

6. The air temperature control assembly of claim 1 wherein said air temperature control unit has a first air temperature set point and a second air temperature set point, said first air temperature set point lower than said second air temperature set point.

7. The air temperature control assembly of claim 1 wherein said air temperature control unit controls air temperature.

8. The air temperature control assembly of claim 1 wherein said air temperature control unit is configured to be controlled remotely through said optical receiver.

9. An air temperature control assembly comprising:
an air temperature control unit;
a cover for said air temperature control unit;
an optical receiver for receiving a light signal, said optical receiver in communication with said air temperature control unit and housed within said cover;
a light guide in communication with said optical receiver for reflecting the light signal to said optical receiver;
wherein said light guide comprises a reflecting surface angled to direct the light signal to said optical receiver and
wherein said reflecting surface comprises a channel having a first aperture on said cover and a second aperture between said first aperture and said optical receiver, said first aperture larger than said second aperture.

10. The air temperature control assembly of claim 9 wherein said channel is formed as a part of said cover.

11. An air temperature control assembly comprising:
an air temperature control unit;
a cover for said air temperature control unit;
an optical receiver for receiving a light signal, said optical receiver in communication with said air temperature control unit and housed within said cover;
a light guide in communication with said optical receiver for reflecting the light signal to said optical receiver; and
an air temperature sensor in communication with said air temperature control unit wherein said cover has a first air vent spaced across said cover from a second air vent, said air temperature sensor spaced between said first air vent and said second air vent.

12. An air temperature control assembly comprising:
an air temperature control unit;
a cover for said air temperature control unit;
an optical receiver for receiving a light signal, said optical receiver in communication with said air temperature control unit and housed within said cover;
a light guide in communication with said optical receiver for reflecting the light signal to said optical receiver; and
a speaker in communication with said optical receiver, said speaker audible when said optical receiver receives the light signal.

13. The air temperature control assembly of claim 12 including a speaker vent on said cover and in communication with said speaker.

14. An air temperature control assembly comprising:
an air temperature control unit;
a cover for said air temperature control unit, said cover having a front surface spaced from a back surface; and
a switch in communication with said air temperature control unit, said switch comprising an arm as part of said cover, said arm flexible between an actuated position and an unactuated position, said arm configured to be actuated manually, said arm disposed between said front surface and said back surface.

15. The air temperature control assembly of claim 14 wherein said arm is recessed from said front surface.

16. The air temperature control assembly of claim 14 including an opening on said cover, said opening defining at least a portion of said arm.

17. The air temperature control assembly of claim 14 wherein said switch actuates an air temperature set point of said air temperature control unit.

18. The air temperature control assembly of claim 14 including an optical receiver in communication with said air temperature control unit.

19. An air temperature control assembly comprising:
an air temperature control unit;
a cover for said air temperature control unit;
a switch in communication with said air temperature control unit, said switch comprising an arm as part of said cover, said arm flexible between an actuated position and an unactuated position;
including an optical receiver in communication with said air temperature control unit; and
a light guide in communication with said optical receiver for reflecting the light signal to said optical receiver wherein said light guide comprises a channel formed by said cover, said channel having a first aperture on said cover and a second aperture between said first aperture and said optical receiver, said first aperture larger than said second aperture.

20. An air temperature control assembly comprising:
an air temperature control unit;
a cover for said air temperature control unit;
a switch in communication with said air temperature control unit, said switch comprising an arm as part of said cover, said arm flexible between an actuated position and an unactuated position;
including an optical receiver in communication with said air temperature control unit; and
a speaker in communication with said optical receiver, said speaker audible when said optical receiver receives the light signal.

21. An air temperature control assembly comprising:
an air temperature control unit;
a cover for said air temperature control unit;
a switch in communication with said air temperature control unit, said switch comprising an arm as part of said cover, said arm flexible between an actuated position and an unactuated position; and
an air temperature sensor in communication with said air temperature control unit wherein said cover has a first air vent and a second air vent, said first air vent spaced across said cover from said second air vent, said air temperature sensor spaced between said first air vent and said second air vent.

22. An air temperature control assembly comprising:
an air temperature control unit;
a cover for said air temperature control unit, said cover comprising a front surface and a back surface;
a switch in communication with said air temperature control unit, said switch comprising an arm and a post formed as part of said cover, said arm flexible between an actuated position and an unactuated position and recessed from said front surface;
an optical receiver for receiving a light signal, said optical receiver for communication with said air temperature control assembly; and
a light guide for communication with said optical receiver for reflecting the light signal to said optical receiver wherein said light guide comprises a channel formed by said cover, said channel having a first aperture on said cover and a second aperture between said first aperture and said optical receiver, said first aperture larger than said second aperture.

23. An air temperature control assembly comprising:
an air temperature control unit;
a cover for said air temperature control unit;
an optical receiver for receiving a light signal, said optical receiver in communication with said air temperature control unit and housed within said cover;
a light guide in communication with said optical receiver for reflecting the light signal to said optical receiver;
wherein said air temperature control unit is configured to be controlled remotely through said optical receiver; and
a remote control for communicating with said optical receiver.

* * * * *